United States Patent
Abedi

(10) Patent No.: US 7,668,138 B2
(45) Date of Patent: *Feb. 23, 2010

(54) CELL SELECTION IN SOFT HANDOVER USING USER EQUIPMENTS' BUFFER OCCUPANCIES AS OCCUPANCIES AS A SELECTION CRITERION

(75) Inventor: Saied Abedi, Berkshire (GB)

(73) Assignee: Fujitsu Limited, Kawasaki (JP)

( * ) Notice: Subject to any disclaimer, the term of this patent is extended or adjusted under 35 U.S.C. 154(b) by 459 days.

This patent is subject to a terminal disclaimer.

(21) Appl. No.: 10/567,313

(22) PCT Filed: Oct. 1, 2004

(86) PCT No.: PCT/GB2004/004180

§ 371 (c)(1),
(2), (4) Date: Feb. 3, 2006

(87) PCT Pub. No.: WO2005/034561

PCT Pub. Date: Apr. 14, 2005

(65) Prior Publication Data

US 2008/0167047 A1    Jul. 10, 2008

(30) Foreign Application Priority Data

Oct. 3, 2003    (GB) .................. 0323245.1

(51) Int. Cl.
*H04W 4/00* (2006.01)
*H04L 1/00* (2006.01)
*H04W 72/00* (2006.01)
*H04W 36/00* (2006.01)
*G06F 15/173* (2006.01)
*G06F 15/16* (2006.01)

(52) U.S. Cl. .......... 370/331; 370/329; 370/238; 455/453; 455/436; 455/442; 455/439; 709/225; 709/231; 709/235

(58) Field of Classification Search .......... 370/331, 370/329, 120, 238; 455/453, 436, 442, 439; 709/225, 231, 235

See application file for complete search history.

(56) References Cited

U.S. PATENT DOCUMENTS 6,603,971 B1    8/2003    Mohebbi (Continued)

FOREIGN PATENT DOCUMENTS

EP    0 981 229    2/2000

(Continued)

OTHER PUBLICATIONS

International Preliminary Report on Patentability and the Written Opinion of the International Searching Authority dated Apr. 13, 2006.

(Continued)

*Primary Examiner*—Vincent P Harper
*Assistant Examiner*—Ariel Balaoing
(74) *Attorney, Agent, or Firm*—Katten Muchin Rosenman LLP

(57) ABSTRACT

Soft handover techniques are disclosed for use in a system comprising a base station and a plurality of user equipments. The amount of data in the data buffer of each of the user equipments is determined, the amount of data in the data buffers is compared to obtain a relative indicator, the relative indicator indicating how full a user equipment's data buffer is in comparison to the data buffers of the other user equipments, and a base station is selected as an active base station in dependence on the relative indicator.

33 Claims, 6 Drawing Sheets

U.S. PATENT DOCUMENTS

| | | | |
|---|---|---|---|
| 6,889,050 B1* | 5/2005 | Willars et al. | 455/452.2 |
| 7,321,780 B2* | 1/2008 | Love et al. | 455/522 |
| 2002/0048258 A1* | 4/2002 | Oyama | 370/229 |
| 2002/0077113 A1* | 6/2002 | Spaling et al. | 455/453 |
| 2002/0080719 A1* | 6/2002 | Parkvall et al. | 370/235 |
| 2002/0093953 A1* | 7/2002 | Naim et al. | 370/386 |
| 2003/0045293 A1* | 3/2003 | Lee et al. | 455/442 |
| 2003/0083069 A1* | 5/2003 | Vadgama | 455/436 |
| 2004/0196809 A1* | 10/2004 | Dillinger et al. | 370/331 |

FOREIGN PATENT DOCUMENTS

| | | |
|---|---|---|
| EP | 1 284 583 | 2/2003 |
| GB | 0323246.9 | 10/2003 |
| WO | WO 02/39760 | 5/2002 |
| WO | WO 03/021984 | 3/2003 |
| WO | WO 2005/034444 | 4/2005 |

OTHER PUBLICATIONS

International Search Report dated Dec. 3, 2004.
United Kingdom Search Report dated Feb. 17, 2004.

* cited by examiner

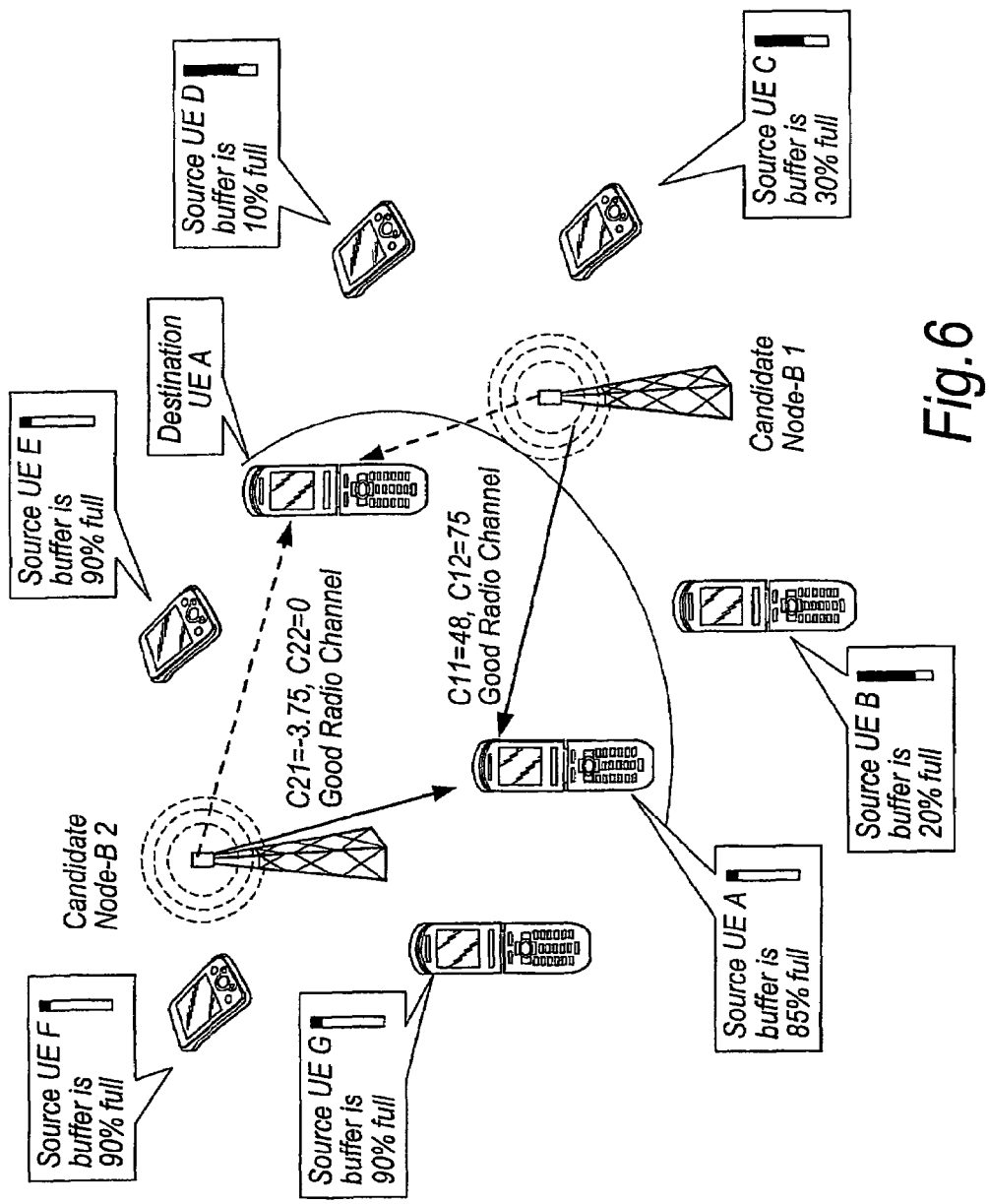

CELL SELECTION IN SOFT HANDOVER USING USER EQUIPMENTS' BUFFER OCCUPANCIES AS OCCUPANCIES AS A SELECTION CRITERION

CROSS-REFERENCE TO RELATED APPLICATION

This application is the National Stage of International Application No. PCT/GB2004/004180, filed Oct. 1, 2004, now International Publication WO 2005/034561 and which claims the benefit under 35 U.S.C. 119(a-e) of GB 0323245.1 filed Oct. 3, 2003, which is herein incorporated by reference.

The present invention relates to soft handover techniques for use in cellular communications systems.

In a cellular mobile communications system, each base station has associated with it a cell covering a certain area (a "footprint"). A user equipment within the coverage area of the cell communicates with the system by transmitting radio signals to, and receiving radio signals from, the base station associated with the cell. The shapes and sizes of different cells can be different and may vary over time. The respective coverage areas of adjacent cells generally overlap with one another so that at any given time, a user equipment may be capable of communicating with more than one base station.

If a user equipment is located in a region where two or more cells overlap, then a soft handover may take place between those cells. During soft handover, a user equipment is in communication with two or more base stations concurrently. Soft handover is used to enable a controlled handover to take place when a user equipment moves from one cell to another, and to take advantage of overlapping cell coverage to increase signal quality. If the user equipment remains in a soft handover region, then it can continue to take advantage of the base station diversity indefinitely.

During soft handover, the user equipment maintains a list of active base stations and candidate base stations. The active base stations are those which are involved in the soft handover operation, i.e. those to which the user equipment transmits its data. The candidate base stations are base stations of which the user equipment is aware, but which are determined not to be suitable for data transmission. In known soft handover techniques, the decision as to which base stations should be involved in the soft handover operation is made based on measures of signal qualities in the respective cells. For example, the user equipment may measure the qualities of signals received from various base stations and use those measures to determine which of the base stations should be active base stations. The selection of the active base stations is updated as the signal from one base station weakens and that from another base station strengthens.

In the known soft handover techniques, the selection of a base station for soft handover is made based on the quality of the radio channel to the base station. However, it has been realised pursuant to the present invention that the base station selection process in soft handover can be made more effective by also considering other factors. In particular, it may be desirable to consider the amount of congestion that is likely to occur in a cell when selecting a base station for soft handover.

In accordance with a first aspect of the invention there is provided a method of selecting an active base station for use during soft handover, the active base station being for receiving data from a plurality of user equipments, the method comprising:

determining the amount of data in the data buffer of each of the user equipments;

comparing the amount of data in the data buffers of the user equipments to obtain a relative indicator, the relative indicator indicating how full a user equipment's data buffer is in comparison to the data buffers of the other user equipments; and selecting a base station as an active base station in dependence on the relative indicator.

By selecting a base station based on the relative amounts of data in the user equipment's buffers, it may be possible to take into account the amount of congestion that the base station may experience. For example, a base station which has many user equipments with relatively full buffers is likely to be receiving large amounts of data, and that base station might therefore become congested. In this case the base station might be avoided. On the other hand, a base station which is likely to receive relatively little data is unlikely to be congested, and therefore might be selected.

The relative indicator may be, for example, an indication of how full a user equipment's buffer is in comparison to the average, or an indication of how full a user equipment's buffer is in comparison to the minimum. A plurality of relative indicators may be obtained for each user equipment, in which case both an indication of how full a user equipment's buffer is in comparison to the average and an indication of how full a user equipment's buffer is in comparison to the minimum may be obtained. By using both of these values, the distribution of the various data buffers in terms of buffer occupancy can be taken into account.

A base station is in communication with all of the user equipments in its cell, and therefore the base station may be in the best position to compare the amount of data in the data buffers of the user equipments. Therefore the comparing step is preferably carried out by the base station. However, the comparing step could be carried out elsewhere, such at an radio network controller (RNC), or at the user equipments themselves, if appropriate.

If the base station carries out the comparing step, then the method may further comprise the step of transmitting the or each relative indicator for each user equipment from the base station to that user equipment. In this way, each user equipment is given some knowledge of the state of the buffer in the other user equipments. The step of selecting a base station may then carried out by the user equipment. Alternatively, the or each relative indicator may be transmitted to a radio network controller, and the step of the step of selecting a base station may be carried out by the radio network controller.

In order for the base station to compare the amount of data in the data buffers of the user equipments, it must have available the actual amount of data in each data buffer. In order to achieve this, in one embodiment, a user equipment determines an amount of data in its data buffer and transmits an indication of the amount of data to the base station. If all of the user equipments transmit the amount of data in their data buffers in this way, the base station is then in a position to determine the relative indicators.

In some circumstances be undesirable for the user equipments to be transmitting indications of the amount of data in their data buffers on a regular basis. For example, if many user equipments are present, or a large amount of data needs to be transmitted in the uplink, the extra transmissions involved in the reporting process may increase the amount of interference or congestion to an unacceptable level. Thus, in a second embodiment, a user equipment sends to the base station an indication of the total amount of data to be sent, and the base station determines the amount of data in the user equipment's data buffer based on the indication of the total amount of data, and the amount of data already received by the base station from that user equipment. This can reduce the number of transmissions involved in the reporting process in the uplink.

A base station may be selected as an active base station based on a history of the or each relative indicator. This can allow long term trends to be taken into account, and may prevent spurious soft handover decisions from being taken. However, most recent values of the relative indicator(s) may be used as well as or instead of the history.

Preferably a base station is selected as an active base station based additionally on a measure of radio channel conditions. This can allow a base station with good radio channels conditions to be selected in preference to one with poor conditions. A base station may be selected as an active base station based on a history of radio channel conditions, which may improve the soft handover decision making process. For example, if the history of the radio channels conditions shows that the radio channel is getting consistently worse, then it may be inferred that slow fading is taking place, in which case that base station may be deselected as an active base station. If the history shows continuous swings between good and bad radio channel conditions, then it may be inferred that fast fading is taking place, and a base station which is not experiencing such conditions may be selected as an active base station in preference. If the radio channel history show that a radio channel is getting very rapidly worse, then that base station may be dropped immediately. On the other hand, a candidate base station which is getting consistently better may be selected as an active base station.

The step of selecting a base station may be carried out by the user equipment, and the method may further comprise transmitting an indication of the selected base station from the user equipment to the base stations. The indication may be, for example, an identification number of the selected base station, or a flag indicating whether or not a particular base station is selected.

In co-pending United Kingdom patent application in the name of Fujitsu Limited entitled "Virtually Centralized Uplink Scheduling" (agent's reference P100261GB00), the entire contents of which are incorporated herein by reference, an uplink scheduling technique is described in which knowledge of the relative amounts of data in the buffers of the user equipments is used in scheduling uplink transmissions. To achieve this, the base station transmits a relative indicator to each user equipment, the relative indicator indicating how full that user equipment's data buffer is in comparison to the data buffers of the other user equipments. The user equipments then schedule their uplink transmissions to the base station in dependence on the relative indicator which they receive.

In a preferred embodiment of the present invention, the same relative indicator which is transmitted from a base station to a user equipment for the purposes of scheduling uplink transmissions is also used in soft handover decisions. Thus the method may further comprise the step of scheduling uplink transmissions in dependence on the or each relative indicator. For example, each user equipment may determine a rate and/or time at which it transmits data to the base station based on the or each relative indicator for that user equipment. If the relative indicator is being-transmitted anyway for the purposes of scheduling the uplink transmissions, then using the relative indicator when making soft handover decisions can allow the decisions to be based at least partially on anticipated congestion levels in a cell without the need to transmit extra information from the base station to the user equipment. In this way uplink scheduling and soft handover can both be enhanced through use of the same relative indicator which is transmitted by the base station.

According to a second aspect of the invention there is provided a base station for receiving data from a plurality of user equipments, the base station comprising:
  means for determining the amount of data in the data buffer of each of the user equipments;
  means for comparing the amount of data in the data buffers of the user equipments to obtain a relative indicator, the relative indicator indicating how full a user equipment's data buffer is in comparison to the data buffers of the other user equipments;
  means for transmitting the relative indicator;
  means for receiving a signal indicating whether the base station has been selected as an active base station for a user equipment; and
  means for allocating a channel to the user equipment if the base station has been selected as an active base station.

The relative indicator may be an indication of how full a user equipment's buffer is in comparison to the average, or the relative indicator may be an indication of how full a user equipment's buffer is in comparison to the minimum. The comparing means may be arranged to produce a plurality of relative indicators for each user equipment.

The transmitting means may be arranged to transmit the or each relative indicator for each user equipment from the base station to that user equipment, or the transmitting means may be arranged to transmit the or each relative indicator to a radio network controller.

According to a third aspect of the invention there is provided a user equipment comprising:
  a data buffer;
  means for transmitting to a base station information concerning an amount of data to be transmitted;
  means for receiving from a base station a relative indicator, the relative indicator indicating how full the data buffer is in comparison to the data buffers of other user equipments served by that base station; and
  means for selecting a base station as an active base station based on the relative indicator.

The user equipment may further comprise means for determining the amount of data in the data buffer, and the information concerning an amount of data to be transmitted may be an indication of the amount of data in the data buffer. Alternatively, the user equipment may further comprise means for determining an amount of data to be transmitted in a call, and the information concerning an amount of data to be transmitted may be an indication of the amount of data to be transmitted in the call.

The receiving means may be arranged to receive a plurality of relative indicators from a base station.

The user equipment may further comprise means for storing a history of the or each relative indicator, and the selecting means may be arranged to select a base station as an active base station based on a history of the or each relative indicator. The selecting means may be arranged to select a base station as an active base station based additionally on a measure of radio channel conditions. The user equipment may further comprise means for storing a history of radio channel conditions, and the selecting means may be arranged to select a base station as an active base station based on a history of radio channel conditions.

The user equipment may further comprise means for transmitting an indication of the selected base station.

The user equipment may further comprise means for scheduling uplink transmissions in dependence on the or each relative indicator. The scheduling means may be arranged to determine a rate and/or time at which data is to be transmitted to the base station based on the or each relative indicator.

The invention may also provide a communications system comprising a base station according to the second aspect and a user equipment according to the third aspect.

In another aspect of the invention there is provided a base station which receives data from a plurality of user equipments, the base station comprising:

a processing unit which determines the amount of data in the data buffer of each of the user equipments, and compares the amount of data in the data buffers of the user equipments to obtain a relative indicator, the relative indicator indicating how full a user equipment's data buffer is in comparison to the data buffers of the other user equipments;

a transmitter which transmits the relative indicator;

a receiver which receives a signal indicating whether the base station has been selected as an active base station for a user equipment; and a channel allocator which allocates a channel to the user equipment if the base station has been selected as an active base station.

In another aspect of the invention there is provided a user equipment comprising:

a data buffer;

a transmitter which transmits to a base station information concerning an amount of data to be transmitted;

a receiver which receives from a base station a relative indicator, the relative indicator indicating how full the data buffer is in comparison to the data buffers of other user equipments served by that base station; and a base station selector which selects a base station as an active base station based on the relative indicator.

Features of any one of the above aspects may be applied to any of the other aspects. Method features may be provided with the apparatus aspects and vice versa.

In any of the above aspects, the various features may be implemented in hardware, or as software modules running on one or more processors.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet web site, or it could be in any other form.

Preferred features of the present invention will now be described, purely by way of example, with reference to the accompanying drawings, in which: —

FIG. 6 shows an example of the operation of an embodiment of the invention.

OVERVIEW OF A CELLULAR COMMUNICATIONS SYSTEM

Figure 1:
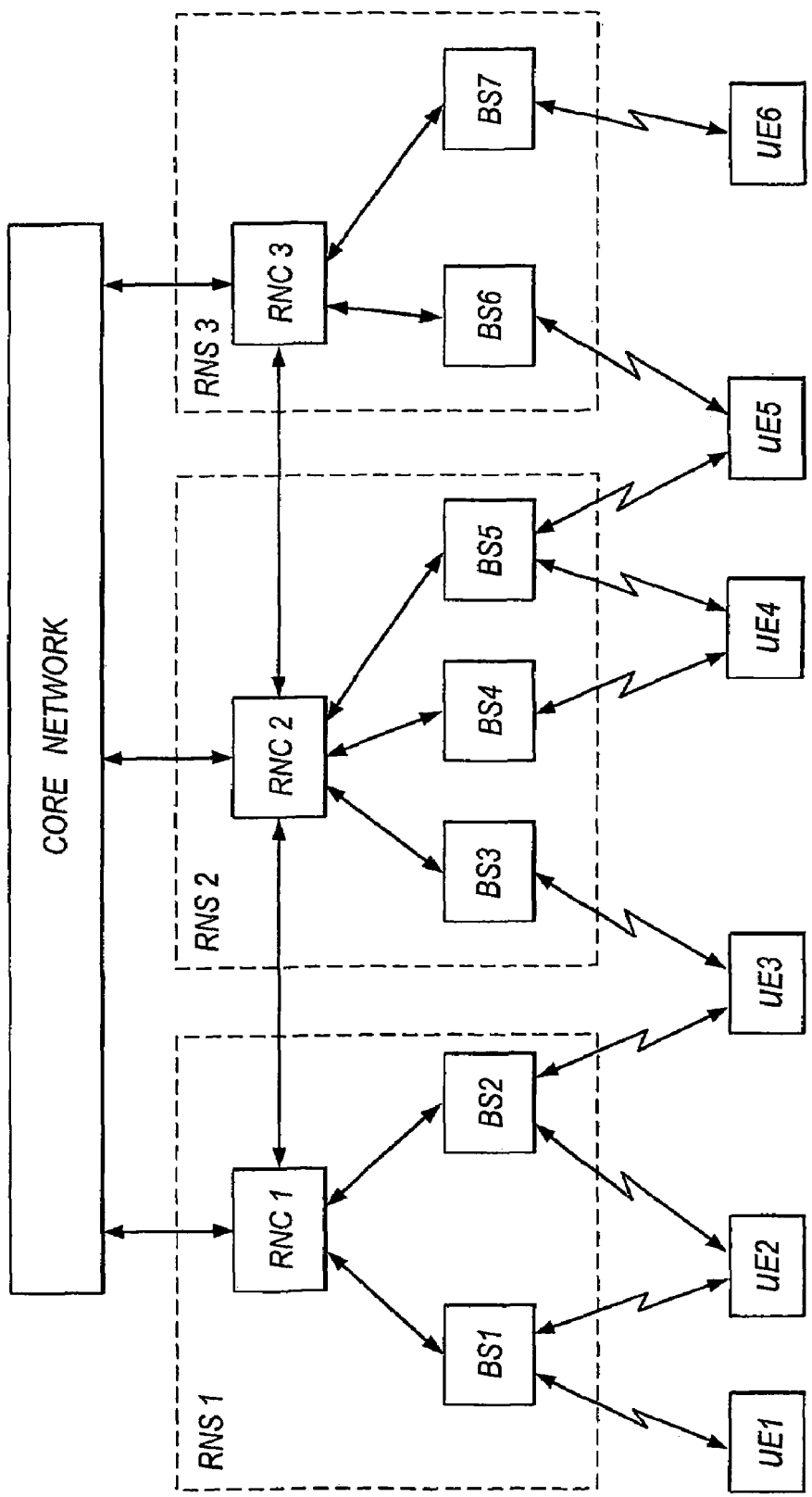
FIG. 1 shows an overview of a cellular mobile communications system.

FIG. 1 shows an overview of a cellular mobile communications system. The system is designed in particular for use with the UMTS (Universal Mobile Telecommunications System) Terrestrial Access Network (UTRA) standard. The system consists of a number of radio network subsystems (RNSs) connected to a core network. The radio network subsystems handle all radio-related functionality, while the core network is responsible for switching and routing calls and data connections to external networks. Each radio network subsystem comprises a radio network controller (RNC) connected to a number of base stations (BS). The base stations manage the radio links with the user equipments (UEs) within their area of coverage (cells). The radio network controller manages the use of radio resources of its cells; for example it is responsible for hard handover decisions and load control.

Data is transmitted between the base stations and the UEs over the air using code division multiple access (CDMA). In CDMA, each channel to be transmitted is spread over a wide spectrum using a unique spreading code. At the receiver the received signal is despread back to the original signal using a replica of the spreading code. By using different spreading codes for different channels, the various channels may be transmitted simultaneously in the same frequency band. Generally the spreading codes are chosen to be orthogonal in order to minimise interference between the channels. CDMA may be used in combination with other multiplexing techniques, such as frequency division multiplexing and time division multiplexing. Each transmission channel may be one of a dedicated channel (reserved for a single user), a common channel (used by all users in a cell) or a shared channel (shared between a number of users on a time division multiplex basis). Beamformers may also be used in either direction to provide directional beams (space division multiplexing).

If a user equipment is located in a region where two or more cells overlap, then a soft handover may take place between those cells. For example, in FIG. 1, UE2 is in an area served by BS1 and BS2, and thus can communicate with both of those base stations. During soft handover, the user equipment maintains a list of active base stations and candidate base stations. It is then necessary for a decision to be taken as to which base station(s) are to be active base stations.

EMBODIMENTS OF THE INVENTION

In embodiments of the invention, soft handover decisions are made based on both knowledge about the quality of the radio channel from the UE to the base station, and knowledge about the amount of data in the buffers of other UEs in the same cell. In this way, the amount of congestion and competition faced by the UE from other UEs in the same cell is taken into consideration when making the soft handover decision.

Within a cell, each of the source UEs is grouped into a particular service group depending on the delay tolerance of the data that it is transmitting. The delay tolerance is a measure of the maximum acceptable time for a data packet to reach its destination. For example, video services may have a low delay tolerance of, say, 100 mS, while web services may have a relatively high delay tolerance.

During a soft handover event, each source UE determines the amount of packet data existing in its buffer and waiting for transmission. Assuming the n-th source UE belongs to the j-th service group with the same delay tolerance, each source UE divides this value by the maximum length of its data buffer to obtain a ratio of buffer occupancy, as follows $$\text{Buffer\_Norm\_}L_n(m) = L_n(m)/L_{max,j}, \quad n=1\ldots N_j \quad (1)$$

where $L_n(m)$ is the amount of data in the buffer, the index m represents the current TTI or soft handover event, N is the total number of source UEs in the cell, and $L_{max,j}$ is the maximum packet data buffer length which depends on the service group j. Each UE multiplies this value Buffer_Norm_$L_n$ (m) by 100 and takes the integer part to obtain a value referred to herein as the buffer occupancy value. Each UE then sends this value to the base station. As an alternative the real numeric value between zero and one could be sent.

The base station receives the buffer occupancy value from each UE served in the uplink. The base station is also aware of the maximum data buffer assigned to each service, and thus the base station can determine the amount of packet data that is currently waiting in each source UE's buffer for transmission. The base station groups the source UEs according to their service class. It then determines the distance of the ratio sent by each source UE from the minimum ratio in each class, as follows $$\text{Distance\_min}_n(m) = \text{Buffer\_Norm\_}L_n(m) - \text{Buffer\_Norm\_}L_{min,j}(m), n=1\ldots N_j \quad (2)$$

where Nj represents the number of UEs present in class j.

To increase the homogeneous behaviour of the metric, if desired, the distance from minimum value may be subject to a secondary normalised and mathematical mapping, by dividing the distance by the sum of all the distances.

Then the base station determines the distance of the ratio sent by each UE from the average ratio in a class of UEs. To do that the base station first determines the average received ratio as follows $$\text{Avg\_Ratio}_j(m) = \frac{1}{N_j} \sum_{i=1}^{N_j} \text{Buffer\_Norm\_}L_i(m) \quad (3)$$

If desired, this metric may also be subject to a secondary normalised and mathematical mapping, by dividing the average received ratio by the sum of all of the received ratios.

The distance from average is expressed as $$\text{Distance\_Avg}_n(m) = \text{Buffer\_Norm\_}L_n(m) - \text{Avg\_Ratio}_j(m), n=1\ldots N_j \quad (4)$$

The base station converts the distance from minimum value and the distance from average value to two information bytes and sends them back to the source UEs in the current soft handover event.

It is assumed that the i-th source UE in soft handover mode is being served by a number of active and candidate base stations in the soft handover set.

$$\text{SHO\_SET}_i = \{\text{Active\_Node\_B}_p, \text{Candidate\_Node\_B}_q\}, \quad (5)$$
$$p = 1\ldots P \; q = 1\ldots Q$$

where $\text{SHO\_SET}_i$ represents the set of active and candidate base stations, Active_Node_$B_p$ represents the p-th active base station, Candidate_Node $B_p$ represents the p-th candidate base station, P is the number of active base stations, and Q is the number of candidate base stations.

A UE which is in soft handover mode receives the distance from minimum and the distance from average values from two or more base stations. These values indicate how the UE stands in terms of the amount of data waiting to be transmitted in the uplink relative to the other UEs in the cell to which they relate. These values can be expressed as follows $$\text{Received\_Dist\_Min}_n(m) = \{\text{Distance\_min}_{n,p}(m), \text{Distance\_min}_{n,q}(m)\} \; p=1\ldots P, q=1\ldots Q \quad (6)$$

$$\text{Received\_Dist\_Avg}_n(m) = \{\text{Distance\_Avg}_{n,p}(m), \text{Distance\_Avg}_{n,q}(m)\} \; p=1\ldots P, q=\ldots Q \quad (7)$$

The UE also creates a profile of the channel to each base station, so that $$\text{Channel}_n(m) = \{\text{Ch}_{n,p}(m), \text{Ch}_{n,q}(m)\} \; p=1\ldots P, q=1\ldots Q \quad (8)$$

where $\text{Ch}_{n,p}$ (m) is the knowledge about the quality of the channel in the uplink from the k-th source UE to the p-th base station.

The distance from minimum and the distance from average values which are sent from the base stations involved in soft handover are saved in separate buffers assigned to each of the base stations. In this way a history of the distance from minimum and distance from average values can be built up for each base station. These histories can be represented as follows $$\text{Credit\_min\_History}_{n,p}(m) = \{\text{Distance\_min}_{n,p}(m),\ldots, \text{Distance\_min}_{n,p}(m-L)\} \quad (9)$$

$$\text{Credit\_Avg\_History}_{n,p}(m) = \{\text{Distance\_Avg}_{n,p}(m),\ldots, \text{Distance\_Avg}_{n,p}(m-L)\} \quad (10)$$

The result is a multiple congestion history buffering mechanism for the source UE.

The history of the quality of the channel between the UE and each base station is also saved, so that $$\text{Channel\_History}_{n,p}(m) = \{\text{Ch}_{n,p}(m), \ldots, \text{Ch}_{n,p}(m-L)\} \quad (11)$$

where L is the length of history buffer.

The source UE studies the trend of the congestion history of all of the active and candidate base stations in all the surrounding and involved cells or sectors. The UE combines the congestions and channel histories to come up with a unique metric for each base station, as follows $$\text{Comb\_Metric}_{n,p}(m) = Co\begin{pmatrix} \text{Channel\_History}_{n,p}(m), \\ \text{Credit\_min\_History}_{n,p}(m), \\ \text{Credit\_Avg\_History}_{n,p}(m) \end{pmatrix} \quad (12)$$

where Co is a function that combine these metrics. For example, the function Co may take the average of the values in each history and then multiply the various average values together. Alternatively or in addition, the function Co might calculate a trend of the values in each history, and then multiply the trends together. Any other appropriate way of combining the various values could be used. The function Co may produce a single value, or a plurality of values. Combining the various histories in this way enables information concerning traffic congestion and radio channel conditions in the uplink to be used in soft handover.

In soft handover mode, a UE is able to compare the base stations in terms of not only the quality of the radio channel but also the amount of traffic congestion the base station handles, and the amount of competition the UE will face if it picks a certain base station. For example, a base station which is serving many UEs with full data buffers may be dropped from the active set. This may happen even if it has a fairly good radio channel conditions compared to other existing active handover set members.

In order to schedule the uplink transmissions, the UE makes a final decision on the transmission format including rate and waiting time based on a final metric which is a combination of received values from the involved active base stations in soft handover mode. This final metric is defined as $$\text{Decisive\_Metric}_n(m) = \text{Combination}\begin{pmatrix} \text{Received\_Dis\_Min}_n(m), \text{Received\_Dis\_Avg}_n(m), \\ \text{Channel}_n(m) \end{pmatrix} \quad (13)$$

The combination process Combination might be similar to the process Co used in the soft handover decision. However the Combination process does not necessarily include the histories of the various values.

First Embodiment

Figure 2:
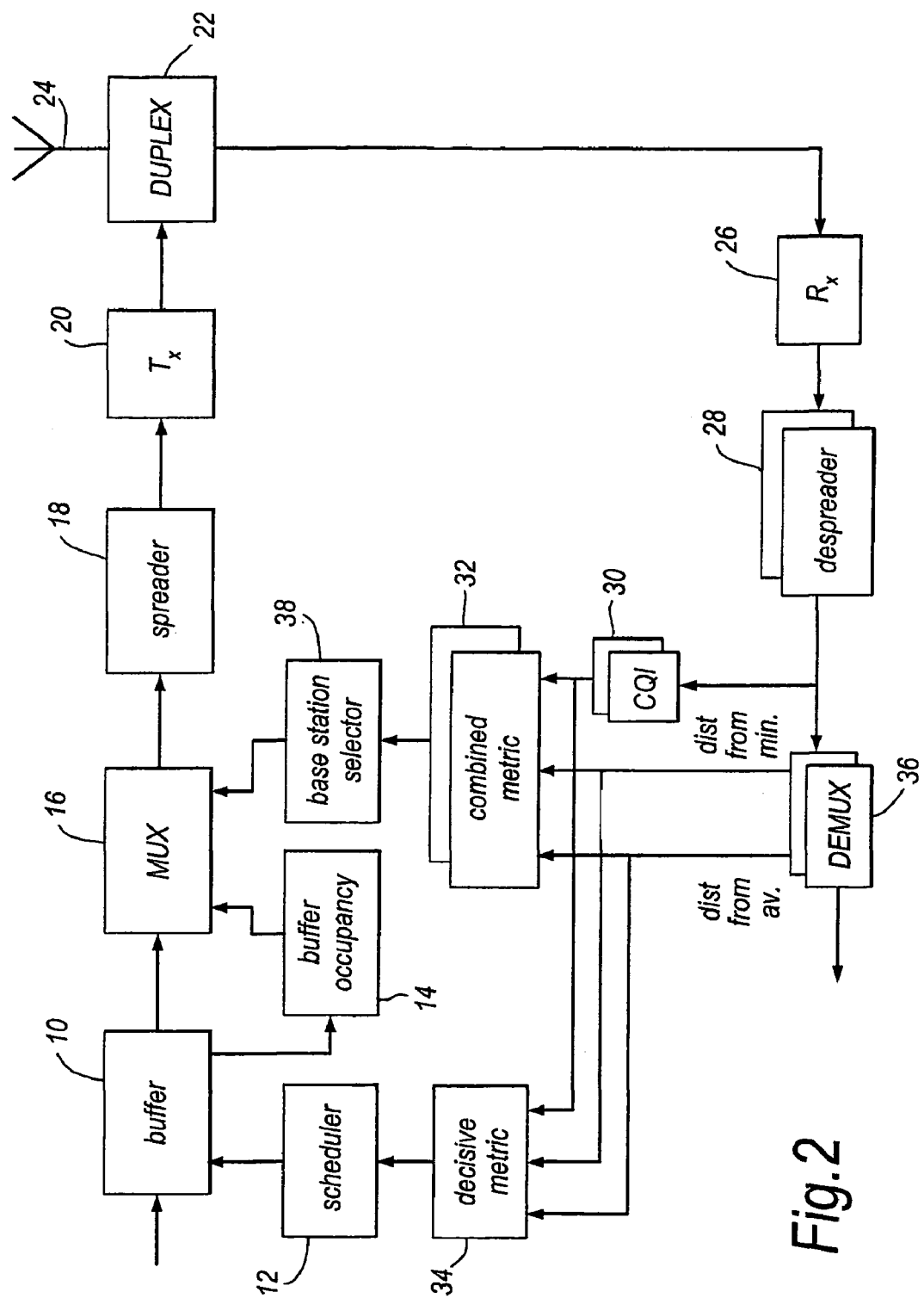
FIG. 2 shows parts of a user equipment in a first embodiment of the invention.

FIG. 2 shows parts of a user equipment in a first embodiment of the invention. Referring to FIG. 2, buffer 10 receives data packets which are to be transmitted and stores them on a first-in-first-out basis. Packets for transmission are output from the buffer 10 under control of scheduler 12.

A signal indicating the number of packets currently stored is output from the buffer 10 to buffer occupancy value calculation unit 14. This unit divides the number of stored packets by the maximum length of the buffer to yield the ratio of stored packets to maximum buffer length, in accordance with equation (1) above. The unit 14 then multiplies this value by 100 and takes the integer part to give a value between 1 and 100, referred to herein as the buffer occupancy value.

The buffer occupancy value calculated by unit 14 is output to multiplexer 16. The multiplexer 16 inserts this value into a control channel which is to be transmitted in the uplink to the base station. An output from base station selector 38 is also multiplexed into the control channel. Packets output from the buffer 10 are inserted into a data channel. The combined signal is then given a channelisation code by spreader 18, and transmitted to the base station by means of transmitter 20, duplexer 22 and antenna 24. Where the user equipment has two or more active base stations, an appropriate channelisation code is used for each base station.

The UE receives incoming signals by means of antenna 24, duplexer 22 and receiver 26. These signals are fed to despreaders 28, which separate out control channels which have been transmitted by the various base stations involved in the soft handover process (both active and candidate base stations). The control channels contain control information for, amongst other things, power control. In this embodiment the control channels also contain the distance from average values and the distance from minimum values transmitted by the base stations involved in the soft handover process.

Channel quality indicators 30 estimate the quality of the channels between the user equipment and the base stations. Any suitable measure of quality can be produced; for example, a received signal strength (RSS) or power measure, a bit error rate (BER) or a frame error rate (FER) measure, or a signal-to-interference ratio (SIR) or a signal-to-interference-and-noise ratio (SINR) measure could be produced. The measure could be based on a pilot signal broadcast by the base station. For example, the strength of the pilot signal could be taken as a measure of signal quality, or the base station may also broadcast the transmit power ratio of a data channel to the pilot channel, and this ratio could be used in conjunction with the pilot signal strength to obtain a measure of signal quality. Alternatively the measure could be derived from transmission power control (TCP) information (such as a power up/power down instruction) generated in the user equipment for downlink power control purposes. Any of the measures could be based on a history or average of measurements taken over several measurement periods. Two or more measures for each channel could be combined, if desired. The outputs of channel quality indicators 30 are fed to combined metric calculation units 32 and decisive metric calculation unit 34.

Demultiplexers 36 separate the distance from average values and the distance from minimum values from the control channels, and pass these values to combined metric calculation units 32 and decisive metric calculation unit 34. Each of the combined metric calculation units 32 combines the distance from average value, the distance from minimum value and the channel quality value from one of the base stations in accordance with equation (12) above, to yield a combined metric for that base station. If desired, more than one combined metric could be calculated for each base station; for example a first metric could be based on the latest values while a second metric could be based on histories of the various values. The various combined metrics are then fed to base station selection unit 38.

Base station selection unit 38 selects one or more base stations as an active base station, based on the combined metrics. For example, if two base stations have similar radio conditions, but one base station is serving many UEs with nearly full buffers, then the base station selection unit may select the other base station as an active base station. If two base stations are in a similar situation regarding the buffers of the UEs which they are serving, then the base station with the best radio conditions may be selected as the active base station. If two base stations are facing similar conditions, then both may be selected as active base stations.

The output of base station selection unit is the identification number(s) of the selected base station(s). This number is multiplexed into the control channel(s) by multiplexer 16 for transmission to the base stations. Alternatively the base station selection unit 38 may output a flag indicating whether a base station has been selected as an active base station. In this case the coding employed in the uplink tells the base station which UE the flag belongs to.

Decisive metric calculation unit 34 combines the distance from average values, the distance from minimum values and the channel quality values to yield a final metric, in accordance with equation (13) above. If required, the number of stored packets value (output from buffer 10) could also be used in calculating the decisive metric. The decisive metric is output to scheduler 12 for use in scheduling uplink data packet transmissions. Where there are two or more active base stations, the average of the decisive metric for all of the active base stations could be used in making scheduling decisions, or the value which gives the highest transmission rate could be used, or some other combination of the various values could be used. The scheduling mechanism may be that described in co-pending United Kingdom patent application entitled "Virtually Centralized Uplink Scheduling" referred to above. In this case, the distance from average values and the distance from minimum values are used for both soft handover and uplink scheduling.

The above reporting processes are repeated at appropriate intervals. For example, the buffer occupancy value may be calculated in the UE and transmitted to the base station every Time Transmission Interval (TTI). Similarly the distance from average values and the distance from minimum values may be calculated in the base station and transmitted to the source UEs every TTI. Any of these processes may also be carried out every two or more TTIs where appropriate. For example, when the uplink channel resources are fully utilised, or nearly fully utilised, it may be desirable to reduce the amount of data which is transmitted for the purposes of soft handover decision making. In this case the reporting processes may only take place every few TTIs. The intervals at which the reporting processes take place may be varied, for example, depending on traffic conditions in the cell or sector.

Figure 3:
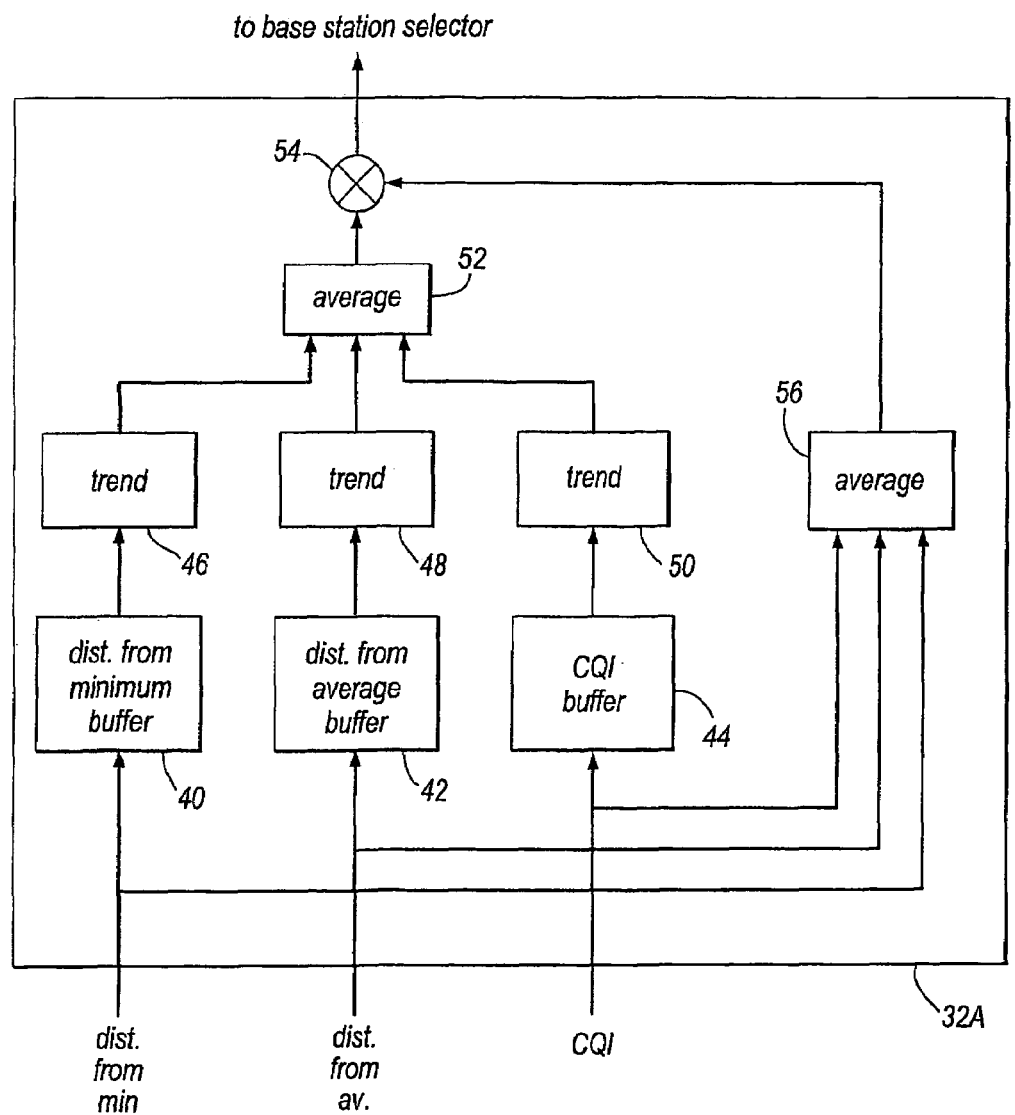
FIG. 3 shows parts of a combined metric calculation unit.

FIG. 3 shows parts of one of the combined metric calculation units 32. Referring to FIG. 3, combined metric calculation unit 32A receives the distance from average and distance from minimum values for a particular base station from one of the demultiplexers 36 in FIG. 2. These values are stored in distance from minimum buffer 40 and distance from average buffer 42 respectively. The unit 32A also receives channel quality indicator values from the corresponding channel quality indicator 30 in FIG. 2. The channel quality indicator values are stored in buffer 44. Each of the buffers has a length L and operates on a first-in-first-out basis, so that it stores the previous L values.

The outputs of the buffers 40, 42 and 44 are fed to trend calculation units 46, 48, 50 respectively. Each of the trend calculation units calculates a trend of the data in the corresponding buffer. This may be done, for example, by taking the differential of a straight line fit to the data in the buffer, and then mapping the value of the differential to a value between zero and one. The outputs of the trend calculation units 46, 48 50 are fed to average calculation unit 52. The average calculation unit 52 calculates the average of the various trends, giving weightings to the trends where appropriate. The output of unit 52 is thus a value indicating an average trend in the various histories. This output is fed to multiplier 54.

The distance from minimum, distance from average and channel quality indicator values are also fed to average calculation unit 56. This unit calculates the average of the various values, using weightings where appropriate. The output of average calculation unit 56 is thus an average of the most recent distance from minimum, distance from average, and channel quality indicator values. This value is also fed to multiplier 54. In this example, the outputs of the two units 52 and 56 multiplied in multiplier 54, using weightings where appropriate, to give a single combined metric. This value is fed to the base station selector 38 in FIG. 2. Alternatively the outputs of the units 52 and 56 could be fed separately to the base station selector 38.

The base station selector 38 uses a look-up table to decide which base station(s) should be the active base stations. As mentioned above, each user equipment maintains a list of active and candidate base stations. The base stations are ranked in the list in the order of the values of the combined metric. At any one time, the base station with the best combined metric is selected as an active base station. If there are another base stations with combined metrics that are nearly as good, then those base stations may also be selected as an active base stations. A total of, for example, three base stations may be active at any one time. However, if the next best base station is much worse than the best base station, then just the best base station may be selected as the active base station.

The list of active and candidate base stations is continually updated. Thus, if an active base station starts giving a poor combined metric, then it may be dropped from the active list. In this case, the candidate base station with the best combined metric may replace the dropped base station in the active list. In a similar way, base stations may be added to or dropped from the list of candidate base stations.

Figure 4:
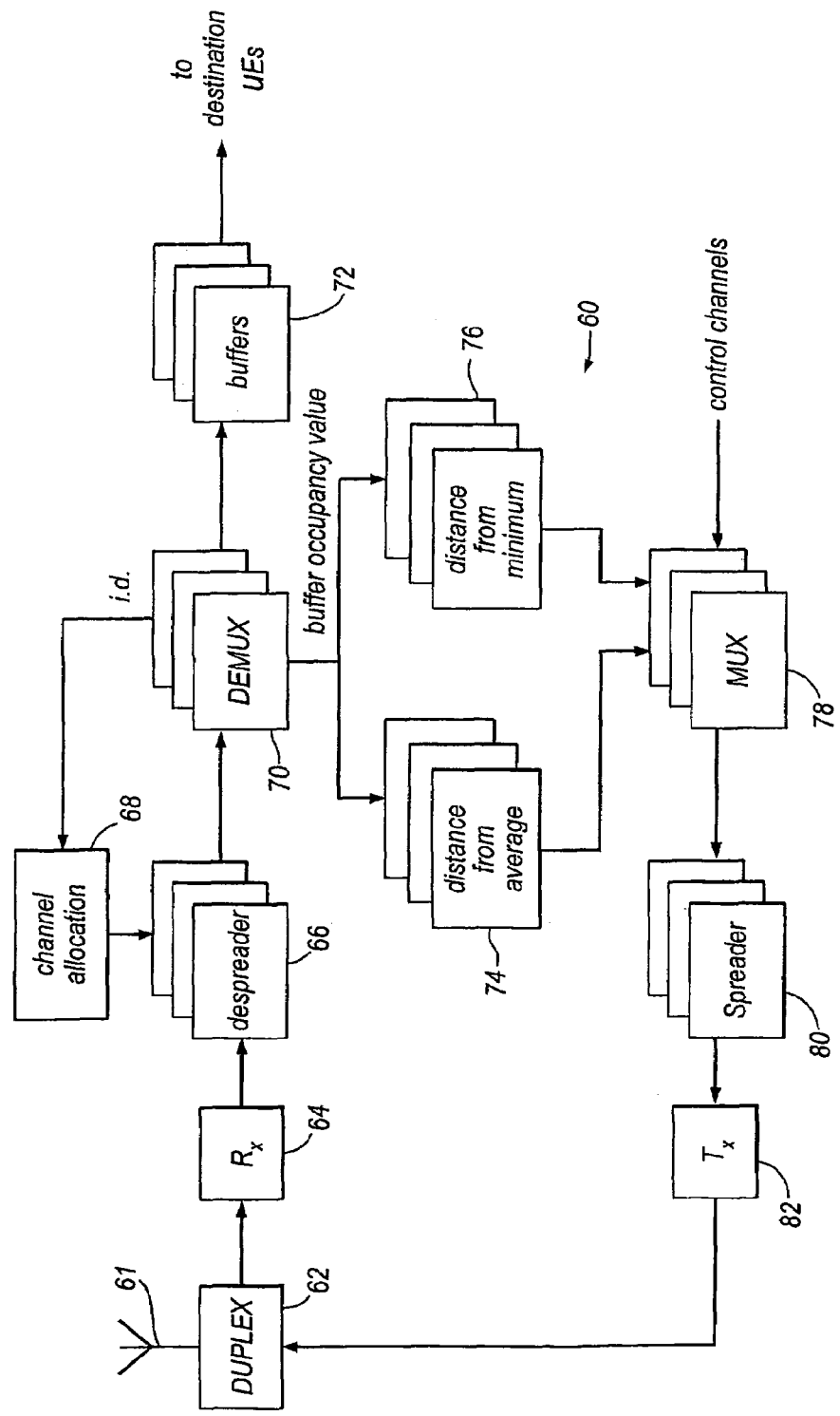
FIG. 4 shows parts of a base station in a first embodiment of the invention.

FIG. 4 shows parts of a base station in the first embodiment. In operation, base station 60 receives signals from antenna 61 and passes these signals to duplexer 62. The duplexer separates received signals from signals to be transmitted, and passes the received signals to receiver 64. The receiver downconverts and digitises the received signals, and passes the signals to despreaders 66.

The despreaders 66 use the channelisation codes employed in the uplink to separate the various channels transmitted by the source UEs. Each of the despreaders 66 outputs a channel from a UE for which the base station is an active base station. The choice of which channelisation codes to use, and thus the choice of which uplink channels to receive, is made by channel allocation unit 68.

The outputs of the despreaders 66 are fed to demultiplexers 70. Each of the demultiplexers 70 demultiplexes from the control channel of a particular UE the identification number of the base station(s) which that UE has selected to be an active base station. The various identification numbers are fed to channel allocation unit 68. If the base station 60 has been selected as an active base station by a particular UE, then the channel allocation unit 68 will allocate a data channel for receiving data transmissions from that UE. The base station will then only despread the data channels for which it is an active base station.

However, the base station 60 may continue to receive control channels from a UE even when it has not been selected as an active base station. This can allow the base station to become an active base station if required.

As an alternative to the identification number of a selected base station, a flag indicating whether or not the base station has been selected as active may be received from each of the UEs. In this case the base station can tell to which UE the flag belongs based on the coding which has been used in the uplink.

The data packets received from the source UEs for which the base station is an active base station are stored in buffers 72, one buffer being provided for each such source UE. The data packets are output from the buffers 72 in accordance with a scheduling routine for onward transmission to the destination UEs. Depending on the location of the destination UE, the data packets may be transmitted to the destination UE in the base station's own downlink, or via a radio network subsystem or core network, or via the public switched telephone network, or via an IP-based network, or via any other network.

The demultiplexers 70 also separate out the buffer occupancy values which have been transmitted by the source UEs. The buffer occupancy values are fed to distance from average calculation units 74 and distance from minimum calculation units 76. Each of the distance from average calculation units 74 calculates the distance of the buffer occupancy value of one of the source UEs from the average buffer occupancy value in that class, in accordance with equations (3) and (4) above. Each of the distance from minimum calculation units 76 calculates the distance of the buffer occupancy value of one of the source UEs from the minimum buffer occupancy value in that class, in accordance with equation (2) above. The outputs of distance from average calculation units 74 and distance from minimum calculation units 76 are therefore the distance from average values and the distance from minimum values respectively for each source UE.

The distance from average values and the distance from minimum values are fed to multiplexers 78. Each of the multiplexers 78 multiplexes the distance from average value and the distance from minimum value for one of the source UEs into a control channel that is to be transmitted to that UE. The various control channels are then given channelisation codes by spreaders 80 and are transmitted to the source UEs by means of transmitter 82, duplexer 62 and antenna 61.

Second Embodiment

In the first embodiment, a buffer occupancy value is sent from each source user equipment to the base station every soft handover event, which may be every TTI, or every few TTIs. However, in some circumstances even reporting every few TTI may be undesirable because of the channel resources which are occupied. Thus, in a second embodiment of the invention, rather than transmit the buffer occupancy values to the base station every scheduling event, the base station estimates the buffer occupancy values based on information transmitted to it at the beginning of a call, together with its own knowledge of how many packets it has received from a particular UE.

In this embodiment it is assumed that each UE is capable of determining the amount of packet data to be sent at the beginning of packet call. Each UE then sends this value to the base station. As communication proceeds further, the base station estimates the amount of data remaining in each UE buffer based on these received values, and the number of packets that have been received from each UE. The estimated values thus obtained are then used to determine distance from average values and distance from minimum values, as in the first embodiment.

In the second embodiment the distance from average and distance from minimum values are transmitted to the UEs for use in uplink scheduling in the same way as in the first embodiment. Thus this reporting process still requires transmission to be made from the base station to the user equipments on a regular basis. However, since the present embodiments are concerned with situations in which data is being sent from the user equipments to the base station, the extra transmissions in the downlink for the reporting process may not be problematic.

A user equipment in the second embodiment is similar to that shown in FIG. 2 except that, instead of buffer occupancy calculation unit 14, a total number of packets indicator is provided which inserts into the control channel at the start of a packet call the total number of packets in that call.

Figure 5:
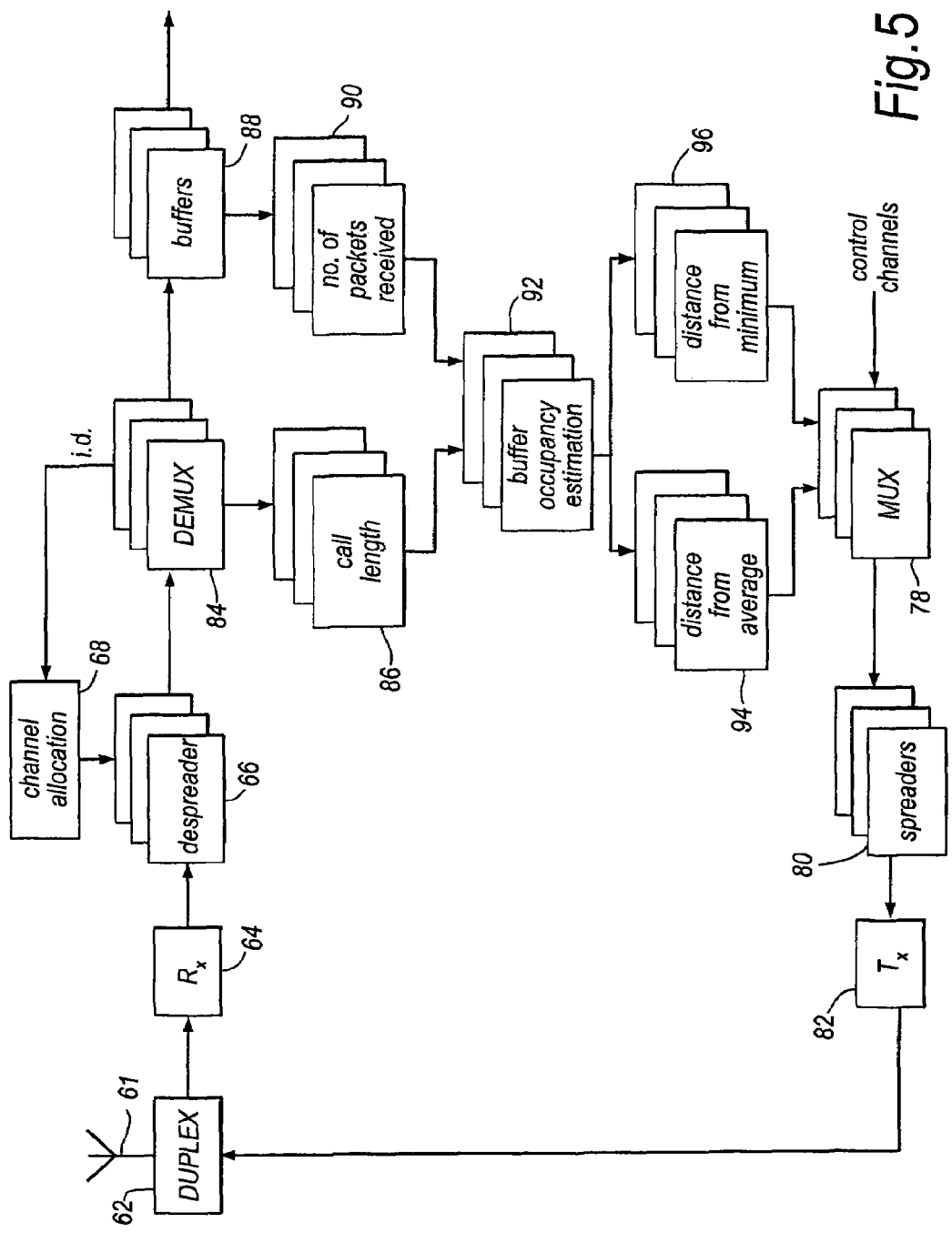
FIG. 5 shows parts of a base station in a second embodiment of the invention.

FIG. 5 shows parts of a base station in the second embodiment. Those parts which are the same as in the base station shown in FIG. 4 are given the same reference numerals and are not described further. Referring to FIG. 5, each of the demultiplexers 84 separates out the total number of packets value which is transmitted by one of the source UEs at the start of a packet call. These values are stored in call length indicators 86. The data packets for onward transmission to the destination UEs are output to buffers 88, one buffer being provided for each destination UE.

For each soft handover event, the number of packets received from each UE in the current packet call is output from the buffers 88 to number of packets received indicators 90. The outputs of call length indicators 86 and number of packets received indicators 90 are fed to buffer occupancy estimation units 92. Each of these units estimates the buffer occupancy for one of the source UEs. This may be done, for example, by subtracting the number of packets received from the total number of packets in a call for that UE. If desired, account could also be taken of the rate at which the UE buffer is expected to be filled.

The outputs of the buffer occupancy estimation units 92 are estimated buffer occupancy values for each of the source UEs. These values are fed to distance from average calculation units 94 and distance from minimum calculation units 96.

These units calculate the distance from average and the distance from minimum values for each class, in a similar way to units 74 and 76 described above with reference to FIG. 4. The outputs of distance from average calculation units 94 and distance from minimum calculation units 96 are therefore estimated distance from average values and estimated distance from minimum values respectively for each source UE.

The thus calculated distance from average values and the distance from minimum values are fed to multiplexers 78 where they are multiplexed into a control channel that is to be transmitted to that UE. The various control channels are then transmitted to the source UEs in the same way as described above with reference to FIG. 4.

If desired, a combination of the first embodiment and the second embodiment could be used. For example, some source UEs could report their buffer occupancies at regular intervals using the first embodiment, while other source UEs could have their buffer occupancies estimated at the base station using the second embodiment. Each UE may switch from one technique to the other, for example, depending on channel conditions.

EXAMPLE

An example of the operation of the soft handover mechanism in an embodiment of the invention will now be described with reference to FIG. 6. In this example, soft handover is combined with an uplink scheduling mechanism, such as the scheduling mechanism disclosed in co-pending United Kingdom patent application entitled "Virtually centralized uplink scheduling" referred to above.

Referring to FIG. 6, source UE A is evaluating two available choices to deliver its data packets to destination UE A. It is assumed that Node-B1 can serve source UEs A, B, C, D. Source UEs A, E, F, G can be served by Node-B2. It is assumed that UE A experiences similar radio channel conditions and SINR (signal to noise and interference ratio) from both Node-B1 and Node-B2. It can be seen that, for the current TTI or uplink scheduling event, source UE A has 85% of its data buffer full. The equivalent value is 20% for UE B, 30% for UE C and 10% for UE D. For Node-B2 these values are 90% for UEs E, F and G. It is assumed that all the source UEs support packet streaming real-time service (e.g. real-time conversational video) with a similar delay tolerance. In FIG. 6, $Ci1$ represents the distance from average value and $Ci2$ represents the distance from minimum value received from Node-Bi. It can be seen that UE A has received $C11=49$ which means the amount of data in its buffer is well above the average amount of all of the UEs served by Node-B1. UE A also receives $C12=75$, meaning that it is far away from the UE with minimum buffer data out of the UEs served by Node-B1. At the same time UE A receives the values $C21=-3.75$ and $C22=0$ from Node-B2. By looking at these two values source UE A realises that, although it has a buffer which is 85% full, it still has the minimum buffer length among all the source UEs served by Node-B2. Source UE A concludes that if it picks Node-B2, it will face fierce competition from source UEs E, F and G which already have full buffers. This would lead to packet delivery delays and more traffic congestion. However, if UE A picks Node-B1, then it will face less congestion and less competition in the uplink. This will also mean less interference for UE A. Considering these evaluations and the fact that source UE A experience similar radio conditions to the two base stations, it picks Node-B1 as the active base station.

Thus, in embodiments of the invention, a source UE is made aware of its situation compared to other UEs served by a given base station, in terms of packet data congestion and the amount of existing competition for radio channels in the cell or sector served by that base station. By making this knowledge available to source UEs from all the active base stations in the active set, and making the UEs capable of combining this information with soft-handover thresholds, better and more efficient soft handover is achieved. The credit history derived from congestion credit buffer allows the UE to look at the trend of packet data congestion and competition for radio channels among all the source UEs served by any specific active or candidate base station. In this way the UE can make predictions about possible future candidates for being dropped from active soft handover set due to, for example, increasing traffic congestion for that base station. If received credit histories from one base station, become worse and worse, the source UE will realize that this base station is becoming too congested and may be replaced by another candidate base station which can handle packet data more efficiently and much faster. The result is a more efficient soft handover mechanism for wireless packet communications which will allow a better QoS and lower delays for continuous real-time streaming services such as real-time conversational video service. In making a decision on active set of base stations, not only the received values from the base stations, also the knowledge available about the radio channel between a candidate base station and the source UE is involved. This makes a packet-congestion-oriented-soft handover possible. The result is effectively striking a balance between the traffic load and radio channel conditions. In order to minimumize the amount of data sent as part of the reporting process, the reports can be sent or received every couple of milliseconds by the UE and can be represented, for example, by only two bytes (16 bits).

Other Embodiments

The RNC already has an idea about the nature of traffic load. This is a global knowledge and overlooking view that the RNC has about the entire cellular area. In view of this available information, as well as the fact that other capabilities already exist in the RNC, it might be preferred to leave the final soft handover decisions to the RNC. If this is the case, and the slow pace of information update at the RNC and its timing mismatch to downlink scheduling timing can be tolerated, and also the necessary communications for transfer of uplink congestion credit values to higher layers and extra network-layer overhead calculations can be afforded by the RNC, an alternative approach is to send the uplink multiple congestion credit values to the RNC. The result is an uplink congestion-oriented, combination of virtually centralised packet uplink scheduler and soft handover, in which the final soft handover decisions are being made by the RNC. However major parts of the calculations related to this hybrid process are distributed among the processors belong to the base stations and the source UEs. In this case, the RNC will be able to determine the Cell_Up and Cell_Down commands and make soft handover decisions by considering the uplink multiple congestion credit values which are now available to it.

The various embodiments which have been described above may be implemented using software modules running on a processor, for example a digital signal processor, or any other type of processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

It will be understood that the present invention has been described above purely by way of example, and modifications of detail can be made within the scope of the invention. For example, the instead of transmitting the distance from average values and the distance from minimum values for the base station to each user equipment, the base station may transmit signals indicating to each base station when and/or at what rate to transmit. The invention may be used with multiplexing techniques other than CDMA, such as time division multiple access (TDMA), frequency division multiplexing (FDM), hybrid TDMA/CDMA, or any other appropriate multiplexing technique.

The invention claimed is:

1. A method of selecting an active base station for use during soft handover, the active base station being for receiving data from a plurality of user equipments, the method comprising:
   determining an amount of data in a data buffer of each of the user equipments;
   comparing the amounts of data in the data buffers of the user equipments to obtain a relative indicator, the relative indicator indicating how full one of the user equipments' data buffer is in comparison to the data buffers of the other of the user equipments; and
   selecting a base station as the active base station for the one user equipment based on the relative indicator.

2. The method according to claim 1, wherein the relative indicator is an indication of how full the one user equipment's buffer is in comparison to an average.

3. The method according to claim 1, wherein the relative indicator is an indication of how full the one user equipment's buffer is in comparison to a minimum.

4. The method according to claim 1, wherein a plurality of relative indicators are obtained for each user equipment.

5. The method according to claim 1, wherein the comparing is carried out by the base station.

6. The method according to claim 5, further comprising transmitting each relative indicator for each user equipment from the base station to that user equipment.

7. The method according to claim 6, wherein the selecting of a base station is carried out by the user equipment.

8. The method according to claim 1, wherein the selecting of a base station is carried out by a radio network controller.

9. The method according to claim 1, wherein the one user equipment determines an amount of data in its data buffer and transmits an indication of the amount of data to the base station.

10. The method according to claim 1, wherein the one user equipment sends to the base station an indication of the total amount of data to be sent, and the base station determines the amount of data in the user equipment's data buffer based on the indication of the total amount of data, and the amount of data already received by the base station from that user equipment.

11. The method according to claim 1, wherein the base station is selected as the active base station based on a history of the relative indicator.

12. The method according to claim 1, wherein the base station is selected as the active base station based additionally on a measure of radio channel conditions.

13. The method according to claim 12, wherein the base station is selected as the active base station based on a history of radio channel conditions.

14. The method according to claim 1, wherein the selecting of a base station is carried out by the user equipment, and the method further comprises transmitting an indication of the selected base station from the user equipment to the base stations.

15. The method according to claim 1, further comprising scheduling uplink transmissions in dependence on the relative indicator.

16. The method according to claim 15, wherein each user equipment determines a rate and/or time at which it transmits data to the base station based on the relative indicator for that user equipment.

17. A base station for receiving data from a plurality of user equipments, the base station comprising:
- a determining unit which determines an amount of data in a data buffer of each of the user equipments;
- a comparing unit which compares the amount of data in the data buffers of the user equipments to obtain a relative indicator, the relative indicator indicating how full one of the user equipments' data buffer is in comparison to the data buffers of the other of the user equipments;
- a transmitting unit which transmits the relative indicator;
- a receiving unit which receives a signal indicating whether the base station has been selected as an active base station for the one user equipment; and
- an allocating unit which allocates a channel to the one user equipment if the base station has been selected as the active base station.

18. The base station according to claim 17, wherein the relative indicator is an indication of how full the one user equipment's buffer is in comparison to an average.

19. The base station according to claim 17, wherein the relative indicator is an indication of how full the one user equipment's buffer is in comparison to a minimum.

20. The base station according to claim 17, wherein the comparing unit is arranged to produce a plurality of relative indicators for each user equipment.

21. The base station according to claim 17, wherein the transmitting unit is arranged to transmit the relative indicator for each user equipment from the base station to that user equipment.

22. The base station according to claim 17, wherein the transmitting unit is arranged to transmit the relative indicator to a radio network controller.

23. A user equipment comprising:
- a data buffer;
- a transmitting unit which transmits to a base station information concerning an amount of data to be transmitted;
- a receiving unit which receives from the base station a relative indicator, the relative indicator indicating how full the data buffer is in comparison to data buffers of other user equipments served by that base station; and
- a selecting unit which selects the base station as an active base station based on the relative indicator.

24. The user equipment according to claim 23, further comprising a determining unit which determines the amount of data in the data buffer, wherein the information concerning the amount of data to be transmitted is an indication of the amount of data in the data buffer.

25. The user equipment according to claim 23, further comprising a determining unit which determines an amount of data to be transmitted in a call, wherein the information concerning the amount of data to be transmitted is an indication of the amount of data to be transmitted in the call.

26. The user equipment according to claim 23, wherein the receiving unit is arranged to receive a plurality of relative indicators from a base station.

27. The user equipment according to claim 23, further comprising a storing unit which stores a history of the relative indicator, wherein the selecting unit is arranged to select the base station as the active base station based on a history of the relative indicator.

28. The user equipment according to claim 23, wherein the selecting unit is arranged to select the base station as the active base station based additionally on a measure of radio channel conditions.

29. The user equipment according to claim 28, further comprising a storing unit which stores a history of radio channel conditions, wherein the selecting unit is arranged to select the base station as the active base station based on a history of radio channel conditions.

30. The user equipment according to claim 23, further comprising a transmitting unit which transmits an indication of the selected base station.

31. The user equipment according to claim 23, further comprising a scheduling unit which schedules uplink transmissions in dependence on the relative indicator.

32. The user equipment according to claim 31, wherein the scheduling unit is arranged to determine a rate and/or time at which data is to be transmitted to the base station based on the or each relative indicator.

33. A communications system comprising:
- a base station for receiving data from a plurality of user equipments, the base station comprising:
  - a determining unit which determines the amount of data in the data buffer of each of the user equipments;
  - a comparing unit which compares the amount of data in the data buffers of the user equipments to obtain a relative indicator, the relative indicator indicating how full a user equipment's data buffer is in comparison to the data buffers of the other user equipments;
  - a first transmitting unit which transmits the relative indicator;
  - a first receiving unit which receives a signal indicating whether the base station has been selected as an active base station for a user equipment; and
  - an allocating unit which allocates a channel to the user equipment if the base station has been selected as the active base station; and
- a user equipment comprising:
  - a data buffer;
  - a second transmitting unit which transmits to said base station information concerning an amount of data to be transmitted;
  - a second receiving unit which receives from said base station said relative indicator, the relative indicator indicating how full the data buffer is in comparison to the data buffers of other user equipments served by that base station; and
  - a selecting unit which selects the base station as the active base station based on the relative indicator.

* * * * *